United States Patent [19]

Yoshino et al.

[11] Patent Number: 5,151,859
[45] Date of Patent: Sep. 29, 1992

[54] LEGGED WALKING ROBOT AND SYSTEM FOR CONTROLLING THE SAME

[75] Inventors: Ryutaro Yoshino; Hiroshi Gomi; Masao Nishikawa; Masato Hirose, all of Saitama, Japan

[73] Assignee: Honda Giken Kogyo Kabushiki Kaisha, Tokyo, Japan

[21] Appl. No.: 545,282

[22] Filed: Jun. 27, 1990

[30] Foreign Application Priority Data

Jun. 29, 1989 [JP] Japan .................................. 1-167295

[51] Int. Cl.⁵ .......................................... B62D 57/02
[52] U.S. Cl. ......................... 364/424.02; 364/424.01; 180/8.6; 901/1; 901/33
[58] Field of Search ...................... 180/8.6; 901/1, 33; 364/424.02, 424.01

[56] References Cited

U.S. PATENT DOCUMENTS

| | | | |
|---|---|---|---|
| 4,202,423 | 5/1990 | Soto | 180/8 D |
| 4,527,650 | 7/1985 | Bartholet | 180/8.6 |
| 4,641,251 | 2/1987 | Inoue | 364/513 |
| 4,738,583 | 4/1988 | Macconochie et al. | 414/735 |

FOREIGN PATENT DOCUMENTS

| | | |
|---|---|---|
| 0108549 | 5/1984 | European Pat. Off. . |
| 62-39377 | 2/1987 | Japan . |
| 62-97005 | 6/1987 | Japan . |
| 62-97006 | 6/1987 | Japan . |
| 0047686 | 2/1989 | Japan ..................... 180/8.6 |
| 248283 | 2/1990 | Japan . |
| 457468 | 3/1975 | U.S.S.R. . |
| 1344350A | 10/1987 | U.S.S.R. . |

OTHER PUBLICATIONS

Russell, Jr., "ODEX 1: The First Functionoid," Oct. 1983, pp. 12–18, Robotics Age, Sep./Oct. 1983.
Kato et al., "Development of the Legged Walking Robot," pp. 71–78, Hitachi Review, vol. 36 (1987) No. 2.
Miura, "Dynamic Walk of a Biped," pp. 60–74, The International Journal of Robotics Research, vol. 3, No. 2, Summer 1984.
JRSJ vol. 1, No. 3, Oct. 1983 "A Control Study of Dynamical Locomotion Robot"; Junji Furusho.

Primary Examiner—Thomas G. Black
Attorney, Agent, or Firm—Lyon & Lyon

[57] ABSTRACT

A biped walking robot and system for controlling the robot. The system provides smooth posture control by eliminating interference arising between the frictional force of the ground acting on the legs of the robot and the driving force of the leg joints. A six-dimensional force and torque sensor is provided to detect six force or moment components and based thereon, an angular command to joint motors is corrected. A joint structure of the robot is described, wherein the axes of the drive joints are arranged at right-angles to one another to thereby enable accurate positional control to be effected using Cartesian coordinates.

13 Claims, 10 Drawing Sheets

LEGGED WALKING ROBOT AND SYSTEM FOR CONTROLLING THE SAME

BACKGROUND OF THE INVENTION

1. Field of The Invention

The present invention relates to a legged walking robot and a system for controlling the same. More particularly, it relates to a system for controlling a drive joint of a legged walking robot which provides smooth posture control by eliminating interference or disturbance between the frictional force of the ground acting on the legs of the robot and the driving force of the leg joints. Furthermore, it relates to various designs for robots including a walking robot in which, for example, the axes of the drive joints are arranged at right-angles to one another thereby enabling positional control to be effected using Cartesian coordinates.

2. Description of The Prior Art

In recent years there has been extensive development of multi-jointed industrial robots, much like the one described in Japanese Laid-open Patent Publication No. 58(1983)-51090, or such as the biped walking robots described in Japanese Laid-open Patent Publication 62(1987)-97005 and 62(1987)-97006. In the case of multi-joint legged mobile robots such as, for example, the above mentioned two-legged mobile robot, controlling the posture by driving the joints with both legs in contact with the ground can cause interference or disturbance between the horizontal frictional force of the ground acting on the robot, and the sum of the horizontal driving power outputs of the robot's joints, producing a vibration or juddering. This phenomenon is caused by the closed link the two legs form with the ground, and because of the fact that positional control alone cannot absorb the degree of error arising in the course of the control.

Figure 1:
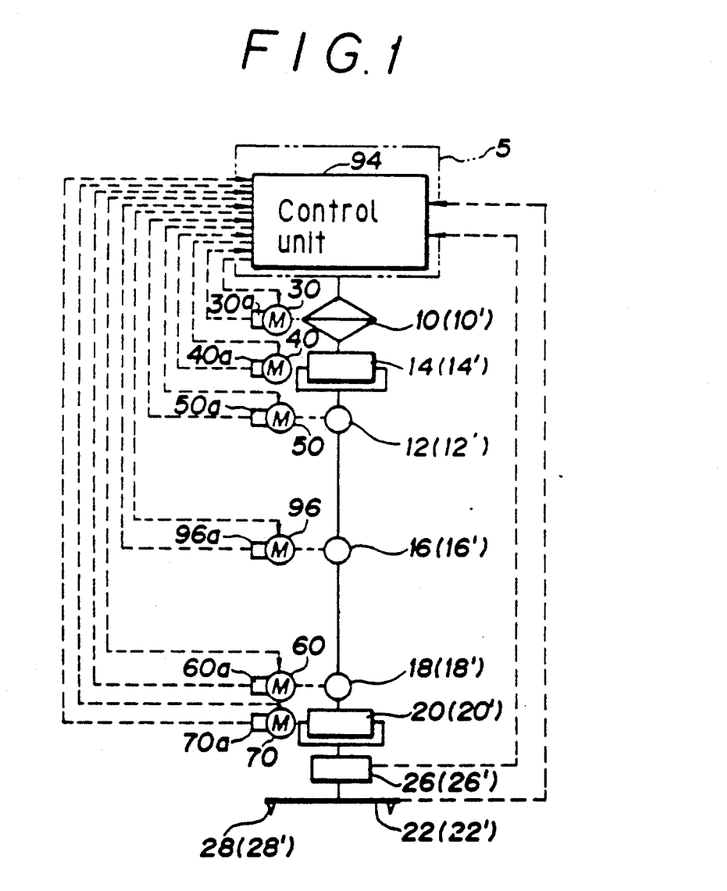
FIG. 1 is a block diagram of a system for controlling a legged walking robot according to the present invention.

With reference to FIG. 1, for example, when the robot has both legs in contact with the ground and the drive joints are driven to alter the posture, the cumulative positional error (degrees, in this case) in the output of the joints is manifested at the points of contact between each of the two legs and the ground, causing them to scrape along the ground. However, owing to the weight of the robot itself acting on the legs, the resistance of the frictional force acting in opposition to this movement subjects the links to an excessive force, while the intermittent sliding of the leg in contact with the ground causes judder. The overall result is that the robot is unable to move smoothly. In the case of stationary industrial robots, one way that is used to solve the problem consists of adjusting the control force if positional control operations give rise to interference. Hence, one reason which causes such a problem results from attempting to effect posture control in a mobile robot using only positional control. The drawbacks can be thus resolved by the use of force control in addition to position control.

Figure 2:
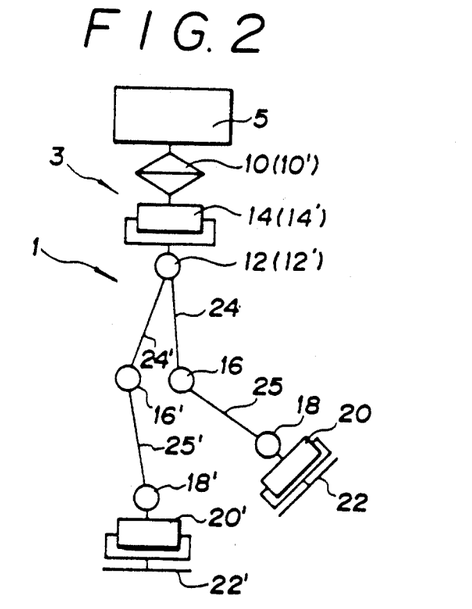
FIG. 2 is a side view of the biped walking robot shown in FIG. 1.

The above problem also occurs when the robot is walking, as is demonstrated in FIG. 2. Assuming a robot in forward motion is being viewed from the front, the same problem will occur during the period when both legs are in contact with the ground. Similarly, if the robot is observed from the side as it is walking, it assumes a state in which the two legs are apart on the ground. The problem is complicated by the fact that the normal condition is for the surface reaction force to be towards the robot's center of gravity rather than vertically to the ground plane, the problem is the same with respect to the fact that error in the positional control of the joints produces an abnormal horizontal reaction force at the point of contact with the ground, making it necessary to resort to force (torque) control to reduce the horizontal reaction force to a normal level.

SUMMARY OF THE INVENTION

The object of the present invention is therefore to provide a system for controlling a drive joint of a legged walking robot whereby smooth posture control is enabled through the incorporation of effective force control with the positional control.

The situation described above also applies when the robot turns. Implementing leg rotation while both legs are in contact with the ground will generate interference between the frictional force of the ground acting in the direction the robot is turning and the turning driving force generated by the joint drives. If as in the case of the two-legged robot shown in FIGS. 1 and 2 the posture is changed by activating the turning drive joints when both legs are in contact with the ground, again the cumulative angular error of the output of the joints will show up at the points of contact between the ground and the legs, causing interference between the legs and the ground. In the case of a human's walking action, by swinging the hips in a horizontal plane in time with the stride, the stride can be lengthened to produce a walking action which does not tire the walker, and this is done without conscious effort on the walker's part. As shown in the drawing, when a robot having a human-like configuration is made to walk using less energy, the joints for rotating the leg are driven to produce the same type of gait as a human's. This being the case, even during the walking motion it is possible for the above problem of interference to arise.

A further object of this invention is therefore to resolve this problem by providing a system for controlling a drive joint of a legged walking robot which, through the incorporation of effective force or moment control with respect to the interference produced when the walking robot turns, enables smooth posture control to be realized.

In each robot joint there are a number of factors which have an adverse effect with respect to control, such as the intrinsic friction and mechanical play of the joint, which poses a problem for parts which rely on force sensing. In the case of a walking robot, as the ground reaction force accounts for most of the external dynamic forces at work, it is necessary for this reaction force to be sensed with good precision. Achieving this precision depends to a considerable degree on the placement of the sensors.

A still further object of the present invention is therefore to provide a system for controlling a drive joint of a legged walking robot whereby interference is effectively prevented through accurate sensing of the ground reaction force.

There is also a strong need for multi-jointed industrial robots, including fixed as well as mobile types, with joints possessing three degrees of freedom. (In this specification the term "degrees of freedom" is used as a motion variable for a robot axis, usually referred to a rotation or extension.) With reference to the above mentioned two-legged walking robot, for example, when one leg is in contact with the ground, the ability to place the trunk of the robot at a particular position and angle, regardless of the position of the leg in contact with the ground, would require a minimum of six degrees of freedom. This holds true for either of the legs, meaning that the above requirement can be fulfilled if each leg has at least six degrees of freedom.

As the two-legged mobile robot is modeled after the human body, it follows that the arrangement of these six degrees of freedom will also be based on the human body. The human body has simple joints, such as the knee, but it also has complex joints such as the hip joints, which have three degrees of freedom. Human hip joints are ball-and-socket arrangements which are moved by the relaxation and contraction of clusters of muscles. At the present level of technology, achieving the motional capabilities of the human hip joint is extremely difficult. It is of course theoretically possible to simulate the motion of the hip joints by linking together three discrete joints. However, driving one of the joints produces positional changes in the other joints, and working out the necessary links for positional control of such multi-joint arrangements is a highly computationally-intensive task which constitutes a major barrier to the realization of a robot's ability to walk quickly. Generally, in arrangements using microcomputers to effect positional control, most of the microcomputer's time is spent converting the coordinate data.

Figure 13:
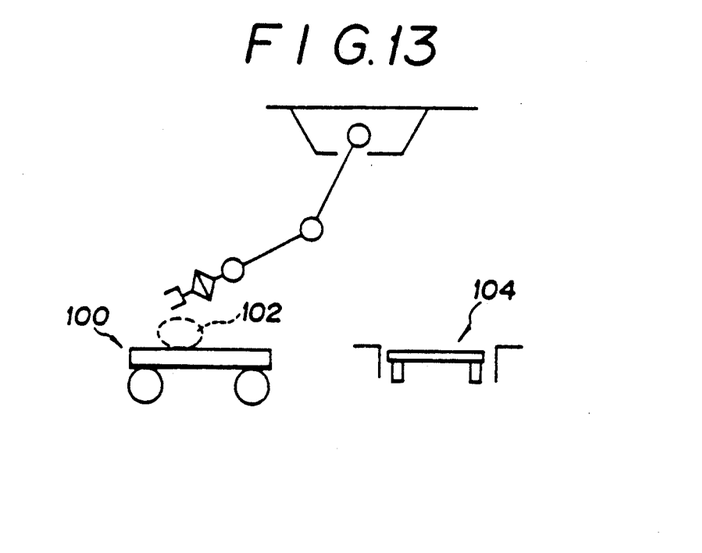
FIG. 13 is an explanatory view showing a stationary robot arm to which the present invention can be applied.

This also applies to other types of robots used for industrial applications, including stationary types such as the robot arm illustrated in FIG. 13. What therefore is required is a small, simple joint mechanism with three degrees of freedom for the base of the arm or the wrist which transfers work 102 from a supply car 100 to a conveyor 104. Japanese Laid-open Patent Publication No. 54(1979)-107060 describes a bevel gear arrangement to provide a single joint with two degrees of freedom, similar to a human wrist joint: the basic structural configuration of the said disclosure has already been realized.

A yet still further object of this invention is therefore to provide a joint mechanism for industrial robots provided with at least three degrees of freedom in which the driving shafts constituting the three degrees of freedom are each arranged at right-angle to one another while at the same time concentrated spatially at one point, enabling a Cartesian coordinate system to be used and thereby facilitating positional control.

Yet a further object of this invention is to provide a joint mechanism for industrial robots which is small and light and has a simple structure.

For realizing the objects, the present invention provides a system for controlling a drive joint of a legged walking robot, including first means for detecting angle of the drive joint of the robot, second means for preestablishing a gait of the robot in terms of angle with respect to time and control means for determining a control value of the drive joint so as to decrease the deviation between the detected and preestablished angles such that the robot walks in the predetermined gait. In the system, the invention in particular add third means for detecting reaction force acting on at least one of legs from the ground to which the leg contacts and said control means corrects the control value in response to the detected reaction force.

In another aspect, the invention provides a robot having a plurality of drive joints which have at least three degrees of freedom, wherein the improvement comprises said drive joints are rotary drive shafts which are arranged at right-angle such that the axes of the shafts are concentrated to intersect spatially at a point.

DETAILED DESCRIPTION OF THE PREFERRED EMBODIMENTS

The invention will now be described with reference to the accompanying drawings. Before describing the control system for the biped walking robot according to the present invention, a brief outline will be provided of the biped walking robot itself, which is the intended application of the invention; this explanation will be given with reference to FIG. 2 onwards.

Figure 3:
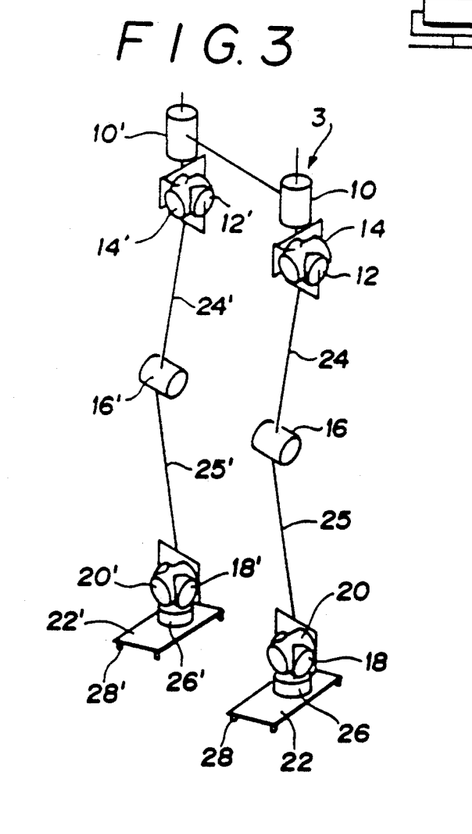
FIG. 3 is an explanatory view of the joints of the robot shown in FIG. 1.

With reference to FIGS. 2 and 3, an industrial robot 1 is an anthropomorphic type, being a two-legged locomotive type with a hip section 3. The upper part of the hip section is connected to a trunk section 5, and legs are attached to its lower portion. As shown in FIG. 3, the hip section 3 is equipped with hip joints constituted of a first joint 10 (10') for leg rotation, a second joint 12 (12') for backward and forward (pitching) movement of the leg, and a third joint 14 (14') for lateral movement (yawing) of the leg. Each leg has a knee joint 16 (16'), which is the fourth joint, a fifth joint 18 (18') for backward and forward movement of the ankle and a sixth joint 20 (20') for lateral movement of the ankle. Attached to the lower part of the ankle is a foot section 22 (22'). Joints are connected by links. For example, the knee joint 16 (16') is connected to the hip section 3 by a thigh link 24 (24') and to the ankle section by a shank link 25 (25'). A six-dimensional force and torque sensor 26 (26'), described later, is disposed at the ankle section, and the foot section is provided with a contact sensor 28 (28') at its sole.

Figure 4:
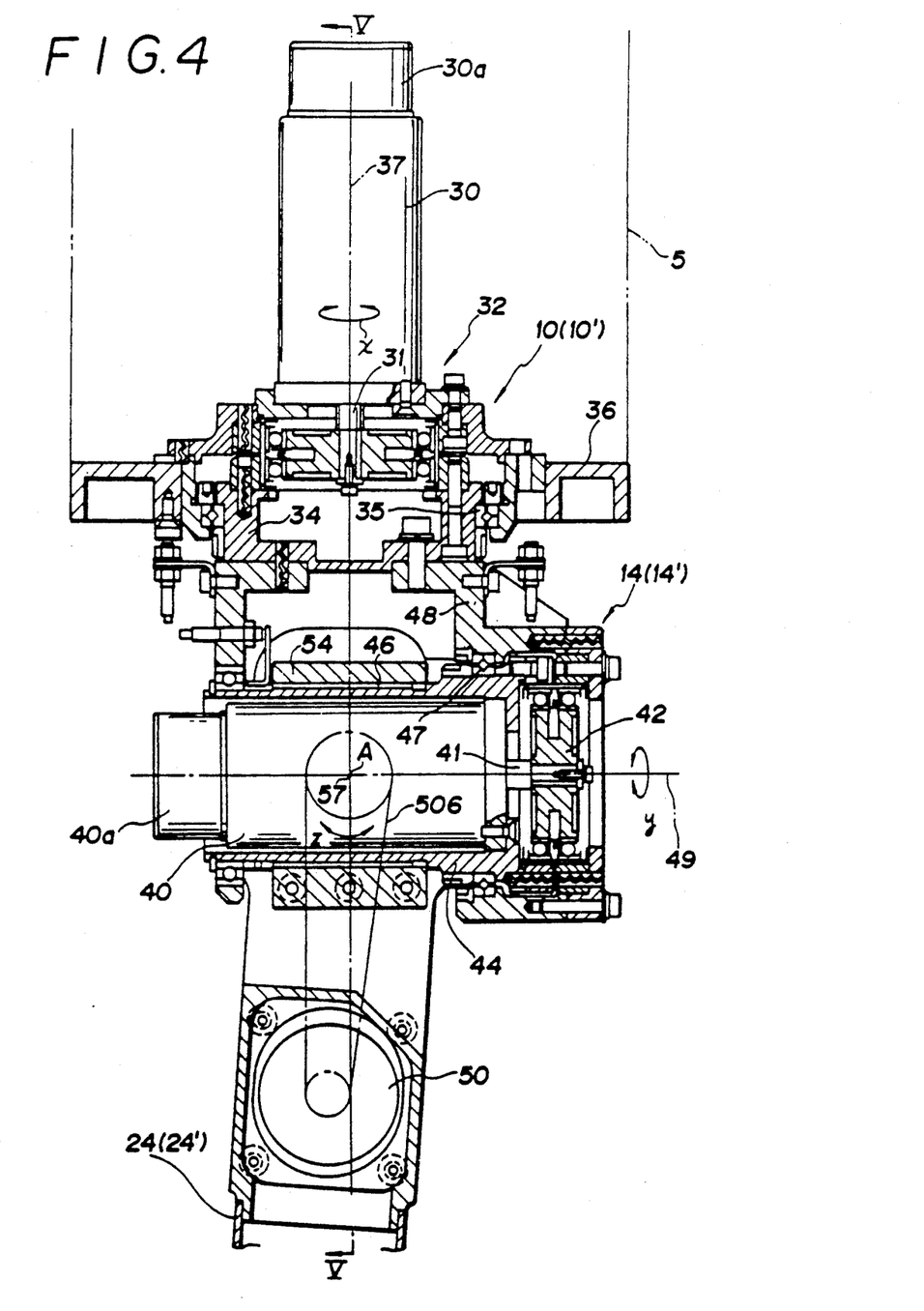
FIG. 4 is a detailed cross-sectional view of the hip joint section of the robot.
Figure 5:
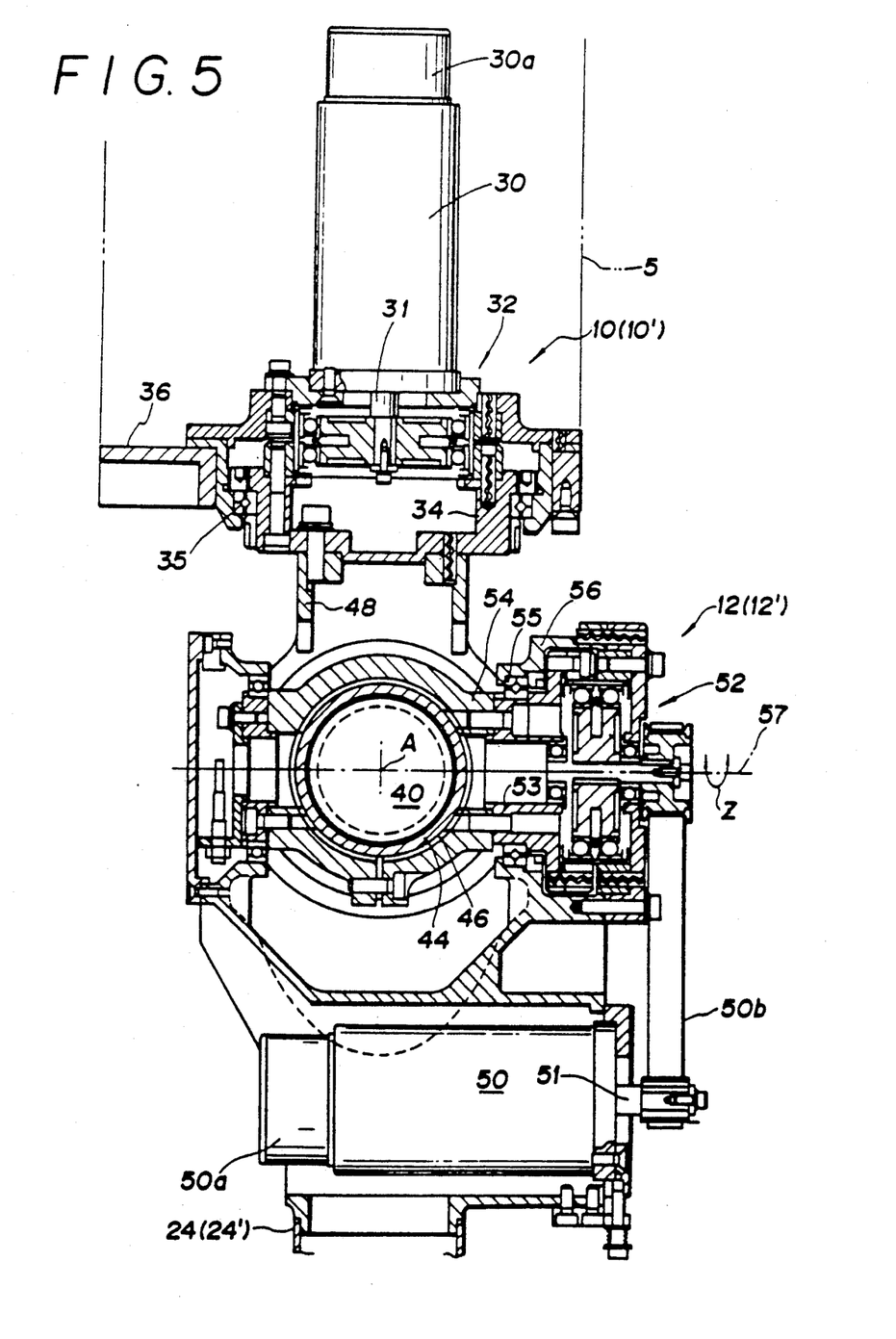
FIG. 5 is a sectional view taken along the line V—V of FIG. 4

Details of the hip joints will now be described with reference to FIGS. 4 and 5. As the two sides are symmetrical in structure, in the following only one side will be referred to.

The output of a DC servo motor 30 is input, via an output shaft 31, to a first harmonic speed reducer 32. The speed reducer 32 reduces the speed by a suitable factor, and the motor output with the torque thus amplified is transmitted on the one hand to a turning member 34 corresponding to the base of the leg, and on the other hand is also transmitted to the base 36 of the trunk section 5 via a bearing 35, the trunk section 5 being arranged so as to be rotatable about the bearing 35. The turning member 34 is turned relative to the base 36 about an axis 37 in the direction indicated by arrow x. The leg attached to the turning member 34 is rotated relative to the trunk section 36 by the motor 30. The angle of rotation of the motor 30 is detected by a rotary encoder 30a placed above the motor 30, and a detection signal is sent to a control unit 94, which will be described at a later stage. In terms of location, this part corresponds to the first joint 10 (10').

A second DC servo motor 40 is provided below the turning member 34 to impart a lateral motion to the leg. The output of the motor 40 is input, via an output shaft 41, to a second harmonic speed reducer 42. The output of the reducer 42 is transmitted to a round motor casing 44, the rotational force of which is transmitted, via a spline 46, to a circular pitch member 54 which is located around the spline 46. The output of the reducer 42 is also transferred to a casing 48 provided around, via a bearing 47, the motor casing 44, causing the pitch member 54 to turn, relative to the casing 48, about an axis 49 in the direction indicated by the arrow y. The pitch member 54 is connected at its lower end to the thigh link 24; the turning motion thereof causes the leg to swing laterally to either side of the forward direction in which the robot is to be advanced. As shown, the axis 49 and the axis 37 are arranged at right-angles to each other and intersect at a point A. The angle of the turning or slewing motion in the direction indicated by the arrow y is detected by a second rotary encoder 40a provided adjacent to the second motor 40, and the detected value is likewise transmitted to the control unit. In terms of position, this part corresponds to the third joint 14 (14').

A recess is formed in the vicinity of the part connecting the link 24 and the pitch member 54. In the recess is provided a third DC servo motor 50 to impart the aforesaid pitching motion to the leg. The shaft of the motor 50 is arranged at right-angles to the shaft of the second motor 40, and the output is taken from the output shaft 51 and transmitted via a timing belt 50b to a third harmonic speed reducer 52. As shown in the drawing, the third harmonic speed reducer 52 is arranged at right-angles to the second harmonic speed reducer 42, and the output thereof is transmitted via a disc 53 to the pitch member 54 which is integrally associated with the disc 54. The other output from the third harmonic speed reducer 52 is transmitted to a joint casing 56 provided around the disc 53 via a bearing 55. The pitch member 54 thus rotates relative to the joint casing 56 about an axis 57 in the direction indicated by the arrow z. In terms of position, this part corresponds to the second joint 12 (12'), and the turning motion imparts a back-and-forth pitching motion along the line in which the robot is to be advanced. Thus, the three axes 37, 49 and 57 are arranged at right-angles to one another and intersect at point A, providing a configuration that is geometrically equivalent to human a hip joint. The angle of the pitching motion is detected by a rotary encoder 50a located on the left side, when viewed in FIG. 4, of the third motor 50, which also sends a signal to the control unit.

Thus the drive joint arrangement in accordance with the invention is comprised of the three motor axes 37, 49 and 57 which constitute the three degrees of freedom which all intersect at point A. Since a microcomputer is used as the control unit, the calculations required for positional control are easily facilitated and a smooth, humanlike walking action is produced. The mutually orthogonal arrangement of the axes also enables Cartesian coordinates to be used, further simplifying positional control and making it possible to increase the walking speed. Moreover, the position of the intersection point A on the axis of the second motor 40 makes the overall joint structure simpler and lighter, which also helps to increase the driving speed of the leg.

Although the embodiment is described with reference to a joint arrangement comprised of three rotary axes, the invention is not limited to such an arrangement. A linear motion element could be included, or linear and rotary motions could be partly or wholly combined in a way that provides three or more degrees of freedom. Again, although the embodiment is described with reference to the hip joint, it will apply equally well to a shoulder joint, for example, and the robot could easily be four-legged instead of two-legged. Similarly, the invention is equally applicable to the type of stationary arm shown in FIG. 13.

Figure 6:
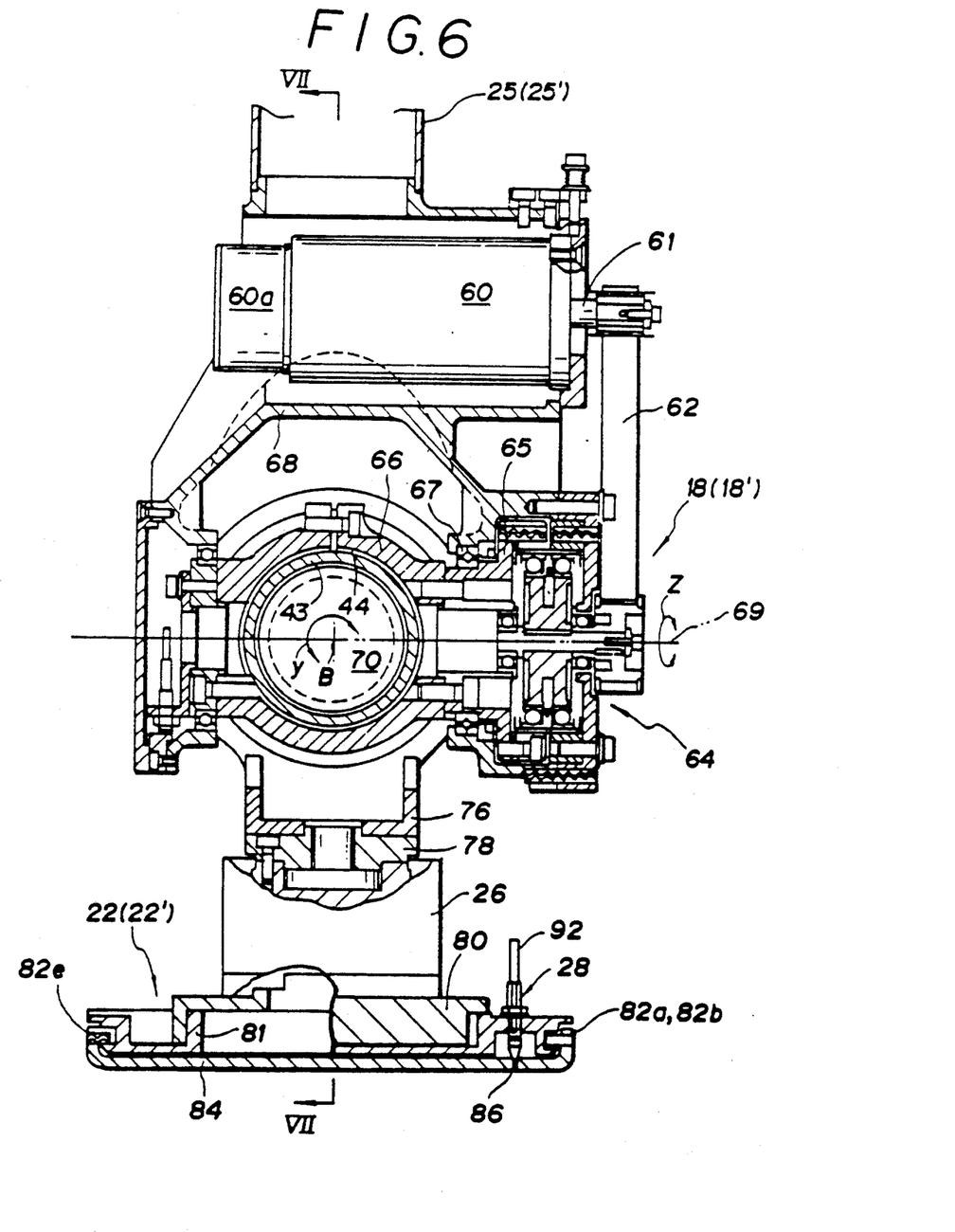
FIG. 6 is a detailed cross-sectional view of the ankle joint of the robot.
Figure 7:
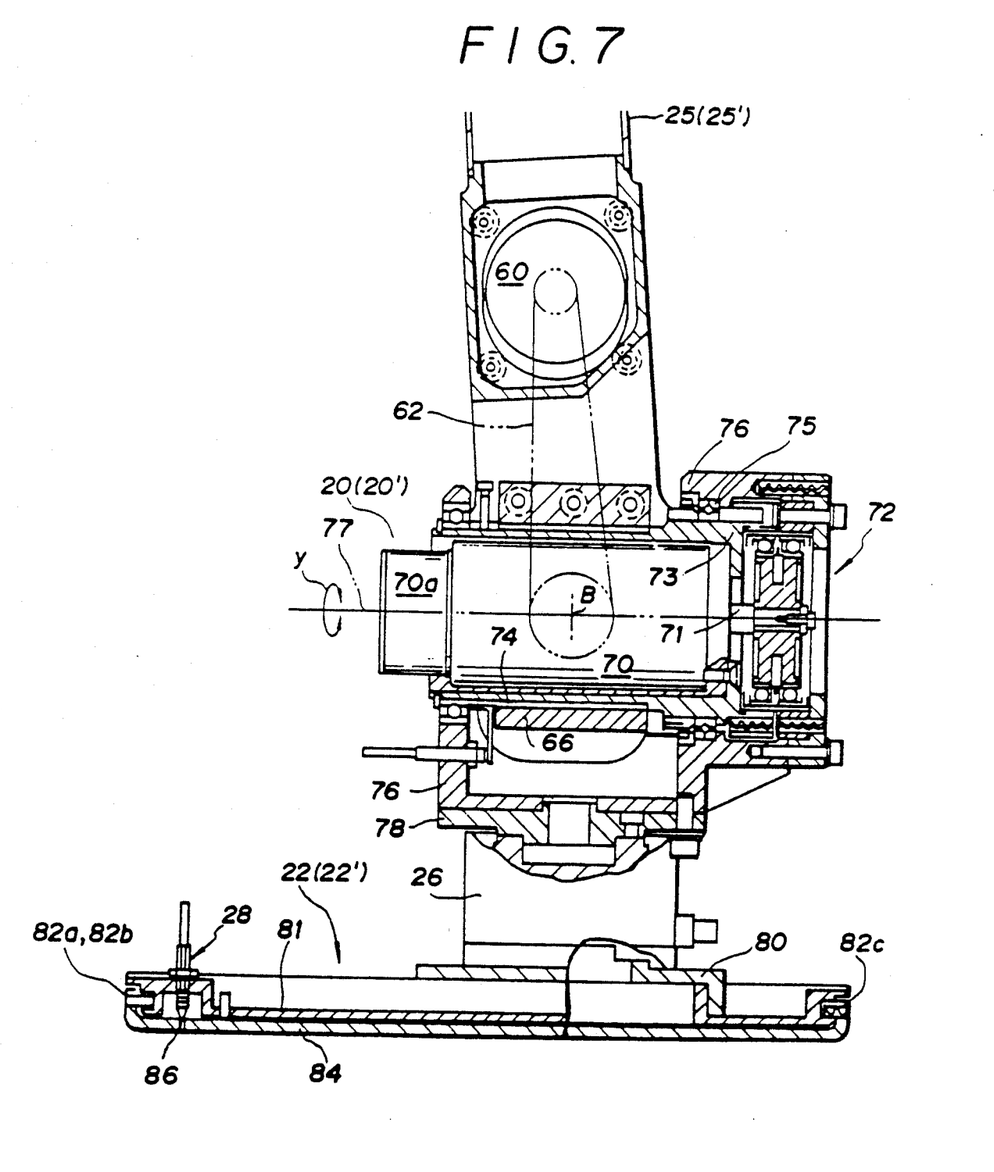
FIG. 7 is a sectional view taken through line VII—VII of FIG. 6.

The ankle joint will now be described with reference to FIGS. 6 and 7. As shown, the ankle is, structurally, an inverted form of the hip joint. A DC motor 60 is housed in a fifth joint 18 (18') (actually in the lower part of the shank link 25). The output of the motor 60 is used to drive the input shaft of a harmonic speed reducer 64 via the motor output shaft 61 and a timing belt 62. One of the outputs of the speed reducer 64 is transferred to a disc 65 and a casing 66, which is integrally associated with the disc. While the other output is transmitted to a joint casing 68 rotatably provided, via a bearing 67, on the outside of the casing 66. The casing 66 with the disc 65 and the joint casing 68 are thus rotated about a center axis 69 in the direction indicated by the arrow z, to cause the foot to swing in the pitching direction.

Provided inside the casing 66 is a second motor 70, the output of which is input, via output shaft 71, to a second harmonic speed reducer 72. An output of the second harmonic speed reducer 72, which is set at a right-angle to the first harmonic speed reducer 64, is transmitted to a cylindrical motor casing 73, and is further transmitted via spline 74 to the casing 66. The other output of the second harmonic speed reducer 72 is transmitted to a second joint casing 76 of the joint 20 (20') provided rotatably on the exterior of the casing 66 by means of a bearing 75, thus producing a rotation of the casing 66 with the disc 65 and the second joint casing 76 about a center axis 77 in the direction indicated by the arrow y, allowing the foot to swing laterally to the pitching direction. The joints 18 (18') and 20 (20') of the foot section are arranged so that the axes 69 and 77 are at right-angles and intersect in the joint at a point B. Reference numerals 60a and 70a denote rotary encoders for detecting the angle of the joint from the angle of rotation of the motors 60 and 70. Although not clearly shown, the knee joint 16 (16') is provided with a DC servo motor to fold the links 24 and 25 with each other in the pitching direction.

The lower section of the second joint casing 76 is connected to the six-dimensional force and torque sensor 26 by a member 78; below this is the foot section 22 (22'). That is, the lower edge of the sensor 26 is attached to an instep portion 80 which is affixed to an inner plate 81. An outer plate 84 is provided beneath the inner plate 81 Eight pins 82a to 82h, partially omitted in the illustration, are used, two to each corner, to suspend the outer plate 84 in a lost-motion arrangement. Each corner of the outer plate 84 is provided with a hole 86, and located in each of the holes 86 is the contact sensor 28 which is affixed to the inner plate 81.

Figure 8:
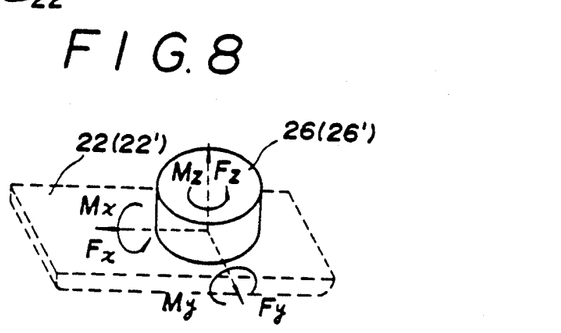
FIG. 8 is an explanatory view showing the function of the six-dimensional force and torque sensor provided on the ankle joint.

The six-dimensional force and torque sensor 26 will now be described with reference to FIG. 8. The sensor 26 is able to simultaneously detect a total of six forces (loads): the three force components Fx, Fy and Fz for forward motion parallel to the ground plane, lateral motion perpendicular to the forward motion and vertical motion perpendicular to the ground, and three moment components, axial moment Mx in the forward direction, axial moment My in the lateral direction and vertical axial moment Mz. The sensor itself is a known type such as the one described in "Development of 6-dimensional Force and Torque Sensor LSA6000A" presented at the 1st robotics sensor symposium, held by the Robotics Society of Japan in January 1988. For positioning the force and torque sensor 26 as shown, it is preferable to arrange it after determining the direction or orientation of the horizontal face whereby a single force Fx is obtained when there is only ground reaction force in the robot's direction of progress. By doing this, when there is a lateral ground reaction force the torque sensor 26 will output a single signal Fy, and therefore the ground reaction force for which correction has to be applied will coincide with the corresponding direction of motion of the joint to be corrected, making it possible to obtain the amount of correction for each joint that needs to be adjusted without complex calculations. In this case, the axis of the moment Mz is positioned so as to be at a right-angle the outer plate 84 which contacts the ground. As a result, the interferential moment acting on the sole portion can be directly detected with good precision, and the amount of correction for the first joint 10 (10') can be readily obtained.

Figure 9:
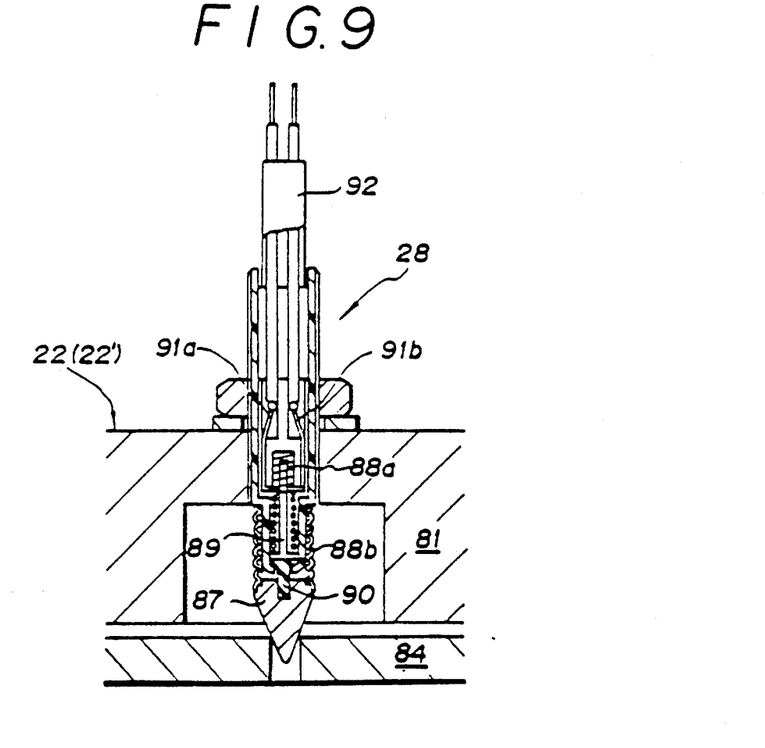
FIG. 9 is a cross-sectional view of the structure of a contact sensor provided on the foot of the robot.

The contact sensor 28 will now be described with reference to FIG. 9. A conical tip 87 is in contact with, via a resilient coupling member 90, an electrically insulative stem 89 which is suspended by springs 88a and 88b. Electrical contacts 91a and 91b extending from a power supply (not shown) are disposed near the stem 89, and are connected to each other by means of the spring 88a. The part of the stem 89 that contacts the lower end of the spring 88a extends outward, forming a cross-shaped configuration, although the configuration is not clearly illustrated in the Figure. When contact with the ground produces a relative displacement between the inner plate 81 and the outer plate 84, the displacement is communicated to the conical tip 87 which lifts the stem 89 upwards so that the cross-shaped portion thereof lifts the spring 88a upwards to break the electric connection. Thus, the contact of a leg with the ground is immediately detected, even when a portion of the outer plate merely touches the ground. Reference numeral 92 denotes a signal line used to transmit detection signals to the control unit 94.

Now, returning to FIG. 1, the control system for the biped walking robot will be explained. The control unit 94 is constituted by a microcomputer and is provided in the trunk section 5. As mentioned earlier, signals from the sensors 26,28 and the rotary encoders 30a, 40a, 50a, 60a and 70a are sent to the control unit 94 and based on the detected signals, the unit calculates the current position (angle) of the joints on the Cartesian coordinate system to determine the required joint drive control amount, which is output to the drive joints as will later be explained with reference to FIG. 10. And, if there is any interference of the forces, an appropriate correction will then be made accordingly. In the drawing, reference numerals 96 and 96a denote a DC servo motor for knee section 16 (16') and a rotary encoder for sensing the angle of motor rotation at the knee joint.

Figure 10:
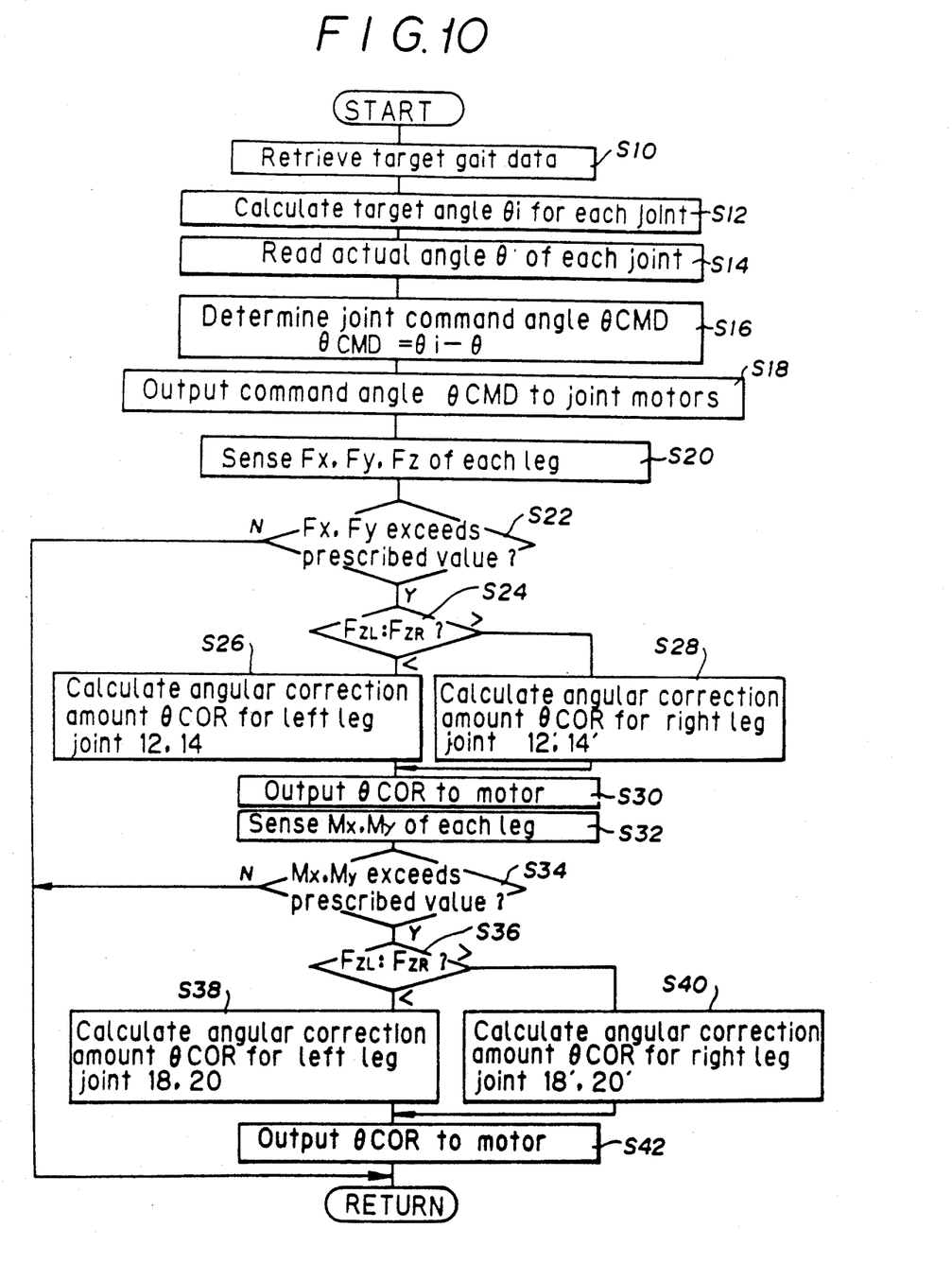
FIG. 10 is a flowchart showing the operation of the control system according to the present invention.

The operation of the control unit will now be described in detail with reference to FIG. 10. The program is activated at prescribed intervals.

Figure 11:
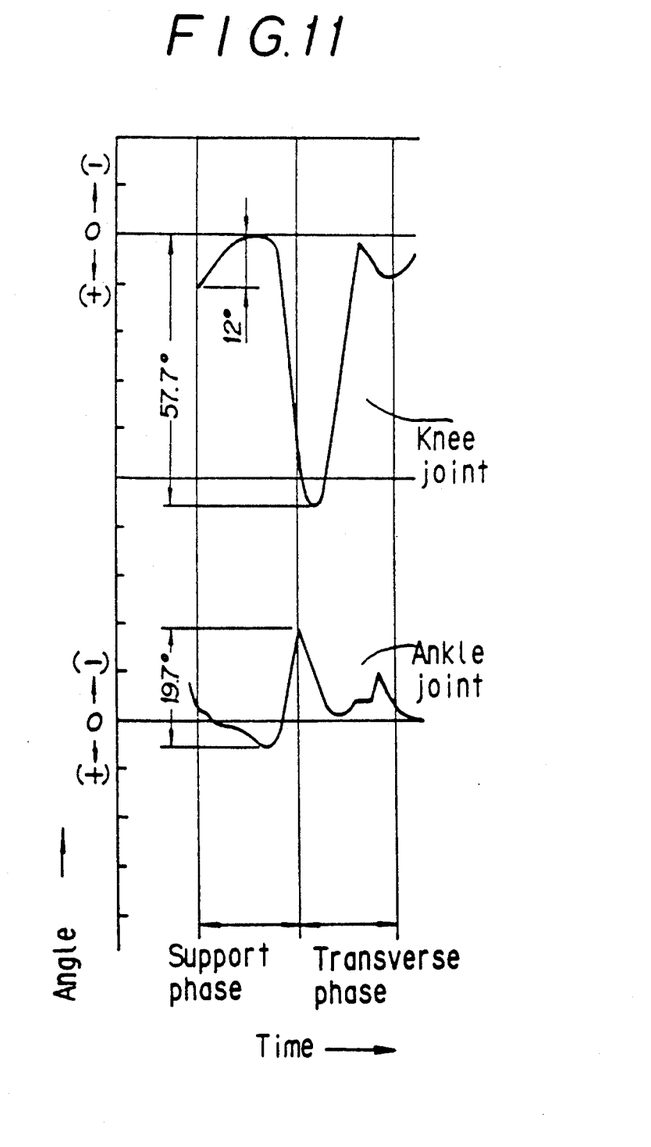
FIG. 11 is an explanatory view of data relating to the muscle function of a human walking on a level surface.

In S10 target gait data is retrieved from memory. FIG. 11 shows experimental data on knee and ankle joint extensions and contractions in the case of a human walking on a level surface. Using similar data as a basis, time series data sets have been preestablished for each joint and stored in memory beforehand.

In S12 a target angle $\theta i$ is calculated for each joint using the retrieved data, and then in S14 the actual joint angle $\theta$ is read out for each joint from the output of the rotary encoders. In S16 the deviation from the target angle and actual angle is obtained for each joint and a command angle $\theta CMD$ is determined for each joint. Then in S18 the command angle is converted into a motor command value in a suitable manner and is sent to each drive joint.

In S20 the output of the six-dimensional force and torque sensor 26 is read and force Fx, Fy or Fz is sensed. Next, in S22, the detected force Fx,Fy is compared with a prescribed value. The prescribed value is set at a suitable level for determining whether the amount of any interferential force arising is such as to require correction. If it is determined that there is no interference, the program is terminated at S22.

In S22, when it is found that the degree of interference is over a prescribed value, the procedure advances to S24 in which, with respect to the vertical force to the ground, the left leg value FzL is compared to the right leg value FzR. If it is found from this that the right leg is on the ground to provide the support the procedure moves on to S26 and the angular correction $\theta COR$ is calculated for the joint 12 or 14 on the left leg, while if it is found that it is mainly the left leg which is supporting the weight the procedure moves to S28 and the angular correction $\theta COR$ for the joint 12' or 14' of the right leg is calculated. Thus, correction is determined to the side carrying the lesser load, enabling the energy used to be reduced by the amount concerned. The procedure next moves on to S30 in which the determined correction angle is converted in a suitable manner into motor control amount signal which is then output to the motor 40 or 50 which in turn drives the joints concerned.

There is a risk that applying correction to joint 12 (12') or 14 (14') might produce more forward and lateral axial moment. Therefore, in S32, moment Mx or My is detected, and in S34 it is confirmed whether or not the moment thus detected is above a prescribed value. If the prescribed value is found to exceed, the procedure moves to S36 where it is again determined which leg is supporting the weight. In accordance with the result, in S38 and S40 angular correction amount $\theta COR$ for ankle section joint 18 (18') or 20 (20') is newly calculated and, in S42, is output to the motor 60 or 70.

In the embodiment as thus described, horizontal frictional force acting on the base of the foot is sensed, and the positional control of the joints is corrected to produce a reduction of the frictional force. When the robot 1 is standing, this effectively prevents interference between the legs, which thereby enables smooth posture control to be achieved. And, if the robot 1 is viewed from the front while it is walking, this provides effective control of the horizontal force components to the left and right, and therefore has high utility; while if the robot is viewed from the side, it shows how to apply an appropriate amount of correction to the joints by comparing theoretical (normal) horizontal reaction force to actual horizontal reaction force. The range of application is therefore expected to be broad.

Furthermore, as the force and torque sensor 26 which detects the various forces including the horizontal force is situated closer to the ground than the ankle is, the interferential force acting on the sole can be directly sensed, providing a major improvement in sensing accuracy and good results. It may be possible to control the moment acting on the hip joint by placing the force and torque sensor between the hip joint and the knee. However, this will cause the sensor to detect noises arising from other factors such as the friction or play in the joints below the sensor. On the contrary, in the case of this embodiment beneficial results can be obtained without any such risk.

In this embodiment, moreover, since the driving direction of joints 12 (12'), 14 (14'), 16 (16'), 18 (18') and 20 (20') coincides with the direction in which the ground reaction force is sensed, the effect of the ground reaction force can be reduced or eliminated by correcting the driving of the joints without having to perform complex calculations, which improves system response and enables real-time control to be implemented. It should be moreover noted that, although joint 12(12') or 14(14') is corrected in S26 to S30 in the aforesaid flow-chart, the correction may be applied to joint 16(16') instead of joint 12(12').

Figure 12:
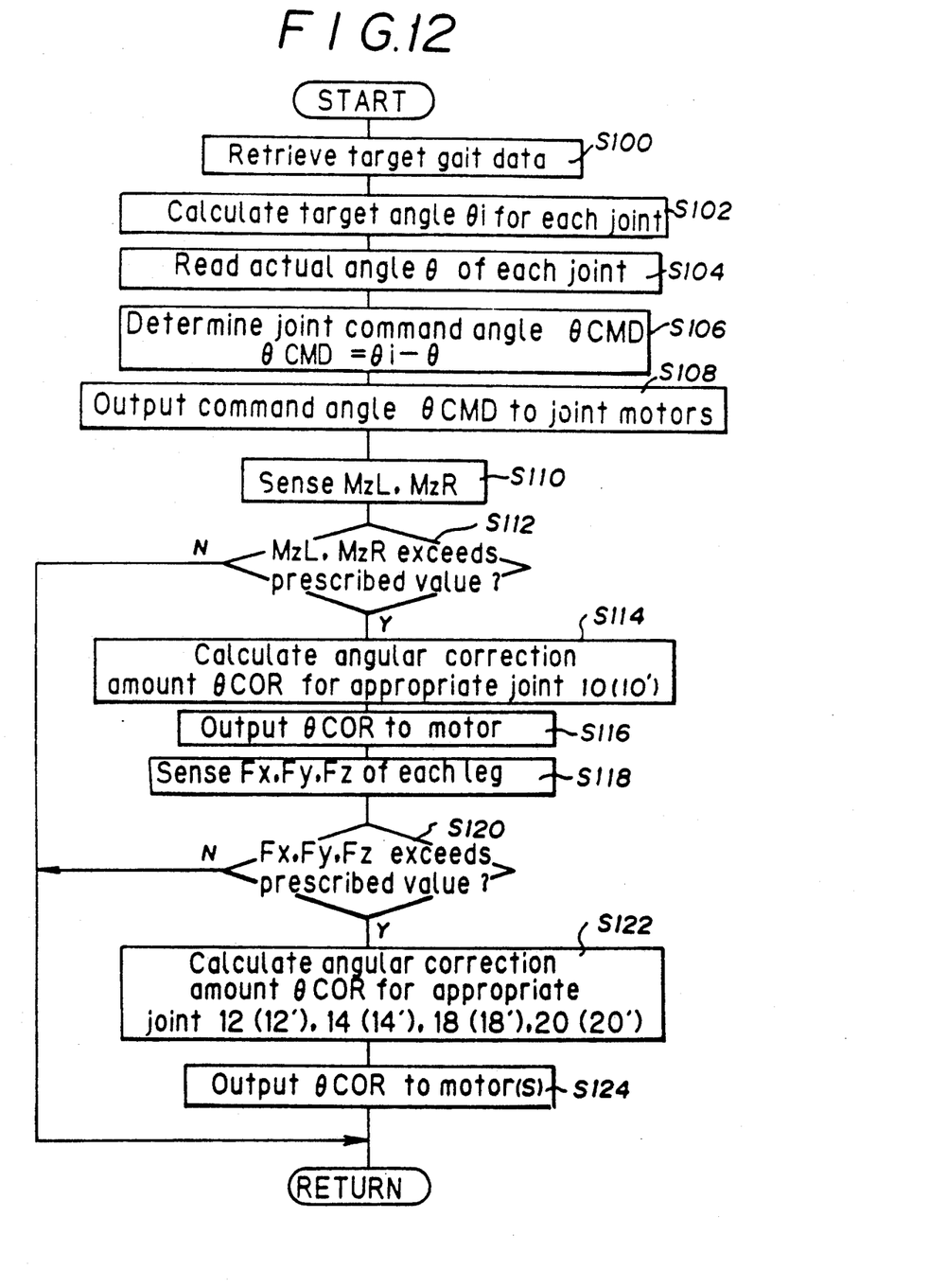
FIG. 12 is a flowchart showing another operation of the control system which constitutes a second embodiment of the present invention.

FIG. 12 is a flow chart of the operation of a second embodiment illustrating a correction technique that, during turning of the robot, eliminates interference in the direction of the rotation. As in the case of the flow-chart of FIG. 10, target walking data have been prepared with respect to time and are retrieved to calculate control values which are then output to the motors (S100 to S108). In S110 moment MzL or MzR is sensed for the legs.

Next, in S112 it is determined whether the detected moment value is above a prescribed value. If the value is found to exceed, the procedure moves to S114 in which angular correction amount $\theta$COR for the joint 10 (10') is calculated so as to reduce or eliminate the interferential force. Then in S116 the angular correction amount is converted into a motor control amount and output to the motor 30.

In S118 it is detected whether fresh interferential force Fx, Fy, Fz has arisen, and if in S120 it is found that the interferential force exceeds a prescribed level, then in S122 correction values are recalculated for the joints concerned and in S124 these are output to the motors concerned. More specifically, since the robot is not always on the ground with his leg(s) contacting vertically to the ground, applying correction to the turning joint 10 (10') carries with it the possibility that other component force may be produced at the point of contact with the ground. This can however be resolved by the application of correction amounts to other joints. In the case of lateral interferential force, correction can be applied to joints 14 (14') and/or 20 (20'), for example, or to joints 12 (12') and/or 18 (18') in the case of forward interferential force.

With the arrangement, the second embodiment thus constituted enables interferential forces during turning to be effectively resolved, resulting in smooth posture control. Other parts of the arrangement are the same as the corresponding parts in the first embodiment. In this example, in some cases correction may be applied to the side which is supporting the weight of the robot.

Although in the embodiments thus described the six-dimensional force and torque sensor is used, the invention is not limited to this. An arrangement may instead be used in which a sensor for sensing horizontal force is used together with a distributed load sensor for sensing vertical forces on the sole portion, for sensing the three component forces Fz, Mx and My. For this distributed load sensing, sensors would need to be provided at three or more points on the sole. There are prior art examples of walking robots which use load sensors at three or four points.

Although the illustrated examples refer to the biped walking robot as an example of a mobile robot, the invention applies equally well to quadruped locomotive or that has more numbers of legs.

What is claimed is:

1. A system for controlling a drive joint of a legged walking robot, including:
    first means for detecting an angle of the drive joint of the robot;
    second means for preestablishing a gait of the robot in terms of angle with respect to time;
    control means for determining a control value of the drive joint so as to decrease the deviation between detected and preestablished angles such that the robot walks in the predetermined gait;
    wherein the improvement comprises:
    third means for detecting a reaction force acting on at least one of the legs from the ground which that leg contacts, the reaction force indicative of an interference between a drive joint driving force and a ground friction force; and
    said control means corrects the control value in response to the detected reaction force, to decrease the interference.

2. A system according to claim 1, wherein said control means corrects the control value in response to the magnitude of the detected horizontal force component.

3. A system according to claim 2, wherein said control means compares the magnitude of the vertical force component for the legs and corrects the control value on the leg whose vertical force component is less than that of the others.

4. A system according to claim 1, wherein said third means is placed on a position below the lowermost joint of the legs.

5. A system according to claim 1, wherein said legs have a degree of freedom that they can be moved in the forward direction or in the direction perpendicular thereto; and
    said third means is placed in the legs in such a manner that the direction in which the sensitivity becomes maximum coincides with the direction in which the degree of freedom is assigned.

6. A system according to any of preceding claims 1 to 5, wherein said correction is carried out in terms of the angle.

7. A system according to any of preceding claims 1 to 5, wherein said robot is a biped walking robot.

8. A system for controlling a drive joint of a legged walking robot having at least one leg which can be turned such that the robot can turn, including:

first means for detecting an angle of the drive joint of the robot;

second means for preestablishing a gait for the robot in terms of angle with respect to time;

control means for determining a control value of the drive joint so as to decrease the deviation between the detected and preestablished angles such that the robot walks in the predetermined gait;

wherein the improvement comprises:

third means for detecting a reaction moment, about a vertical axis of, and acting on at least the turnable leg from the ground which the leg contacts, the reaction moment indicative of an interference between a joint driving force and a ground friction force; and said control means corrects the control value in response to the magnitude of the detected vertical reaction moment, to decrease the interference.

9. A system according to claim 8, wherein said third means detects sharing force acting at least one of the legs from the ground to which the leg contacts; and said control means recorrects the control value in response to the load which newly results on the leg when the first correction has been carried out thereon.

10. A system according to claim 8, wherein said third means is placed at a position below the lowermost joint of the legs.

11. A system according to claim 8, wherein said legs have a degree of freedom that they can be moved in the forward direction or in the direction perpendicular thereto; and said third means is placed in the legs in such a manner that the direction in which the sensitivity becomes maximum coincides with the direction in which the degree of freedom is assigned.

12. A system for controlling a drive joint of a walking robot having legs comprising:

an angle detector for detecting a drive joint angle;

means for setting desired angular movement of the drive joint;

a controller for determining a control value of the drive joint angle, linked to the means for setting and angle detector, to decrease any deviation of the detected drive joint angle and a desired angle of the drive joint, such that the robot moves with a desired gait;

a ground reaction detector on at least one of the legs and linked to the controller; and a corrector associated with the controller to correct the control value in response to a detected ground reaction.

13. A method for controlling a drive joint of a legged walking robot comprising the steps of:

detecting an angle of the drive joint of the robot;

preestablishing a gait of the robot in terms of angle with respect to time;

determining a control value of the drive joint so as to decrease any deviation between detected and preestablished angles of the drive joint such that the robot walks in the predetermined gait;

detecting any reaction force from the ground acting on at least one of the legs; and correcting the control value in response to the detected reaction force.

* * * * *